US012739117B2

(12) United States Patent
Omata et al.

(10) Patent No.: US 12,739,117 B2
(45) Date of Patent: Sep. 15, 2026

(54) INFORMATION PROCESSING DEVICE, INFORMATION PROCESSING METHOD, INFORMATION PROCESSING SYSTEM, AND COMPUTER PROGRAM

(71) Applicant: SONY SEMICONDUCTOR SOLUTIONS CORPORATION, Kanagawa (JP)

(72) Inventors: Kentaro Omata, Tokyo (JP); Takashi Sotohebo, Fukuoka (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 0 days.

(21) Appl. No.: 18/689,671

(22) PCT Filed: Sep. 7, 2022

(86) PCT No.: PCT/JP2022/033511
§ 371 (c)(1),
(2) Date: Mar. 6, 2024

(87) PCT Pub. No.: WO2023/042720
PCT Pub. Date: Mar. 23, 2023

(65) Prior Publication Data

US 2024/0421991 A1 Dec. 19, 2024

Related U.S. Application Data

(60) Provisional application No. 63/244,021, filed on Sep. 14, 2021.

(51) Int. Cl.

| | |
|---|---|
| ***H04L 9/14*** | (2006.01) |
| ***H04L 9/08*** | (2006.01) |
| ***H04L 9/30*** | (2006.01) |

(52) U.S. Cl.
CPC ................ *H04L 9/14* (2013.01); *H04L 9/088* (2013.01); *H04L 9/3066* (2013.01)

(58) Field of Classification Search
CPC .......... H04L 9/14; H04L 9/088; H04L 9/3066
See application file for complete search history.

(56) References Cited

U.S. PATENT DOCUMENTS 10,218,504 B1 * 2/2019 Kalach ................. H04L 9/0819
2004/0218064 A1 11/2004 Wakao
(Continued)

FOREIGN PATENT DOCUMENTS

JP 2004-336136 11/2004
JP 2010-219883 9/2010
(Continued)

OTHER PUBLICATIONS

English Translation of International Search Report prepared by the Japan Patent Office on Oct. 28, 2022, for International Application No. PCT/JP2022/033511, 3 pgs.
(Continued)

*Primary Examiner* — Darshan I Dhruv
(74) *Attorney, Agent, or Firm* — SHERIDAN ROSS P.C.

(57) ABSTRACT

An image sensor according to an embodiment includes a first key information storage unit that holds a first secret key SK1 in advance, a communication unit that receives a second public key PK2 corresponding to a second secret key SK2 different from the first secret key SK1 from the external apparatus, a first session key generation unit that generates a session key on the basis of the first secret key SK1 and the second public key PK2, and a first encryption unit that generates, on the basis of a session key generated by the first session key generation unit and image data, coded information including at least one of authenticated information or encrypted information.

24 Claims, 9 Drawing Sheets

(56) References Cited

U.S. PATENT DOCUMENTS

| | | | | |
|---|---|---|---|---|
| 2008/0165958 | A1* | 7/2008 | Matsushita | G06F 21/10 380/44 |
| 2017/0187524 | A1* | 6/2017 | Furukawa | H04L 9/0844 |
| 2017/0208062 | A1* | 7/2017 | Morikawa | H04L 9/0877 |
| 2018/0227279 | A1* | 8/2018 | Kim | H04W 12/069 |
| 2019/0068582 | A1* | 2/2019 | Kim | H04L 63/0823 |
| 2019/0097805 | A1* | 3/2019 | Shin | H04L 9/3228 |
| 2020/0007321 | A1* | 1/2020 | Doliwa | H04L 9/14 |
| 2020/0111095 | A1* | 4/2020 | Osborn | H04L 9/3242 |
| 2021/0194724 | A1* | 6/2021 | Lee | H04J 14/0283 |

FOREIGN PATENT DOCUMENTS

| | | | | |
|---|---|---|---|---|
| JP | 2010-283635 | | 12/2010 | |
| JP | 2018-121125 | | 8/2018 | |
| JP | 2019-057755 | | 4/2019 | |
| WO | WO-2004054260 | A1 * | 6/2004 | H04N 21/4405 |
| WO | WO-2017004470 | A1 * | 1/2017 | H04L 9/3265 |
| WO | WO 2018/230366 | | 12/2018 | |

OTHER PUBLICATIONS

Ipusiron, “All About Cryptography, 1st Edition,” Shoei Publishing Co., 2017, pp. 570-579 (no English translation available).

* cited by examiner

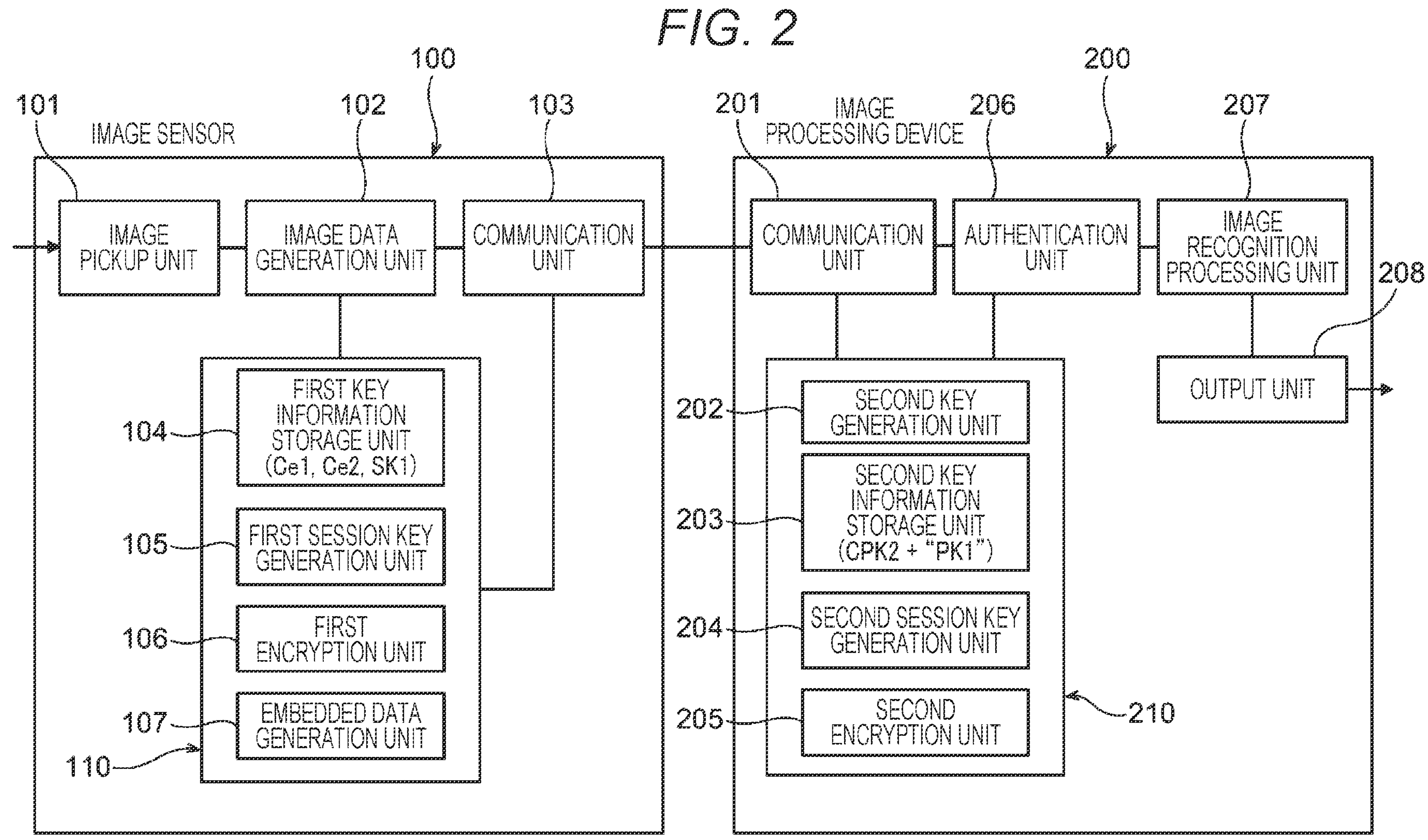
FIG. 2
101
IMAGE SENSOR
102
100
103
IMAGE PICKUP UNIT
IMAGE DATA GENERATION UNIT
COMMUNICATION UNIT
104
FIRST KEY INFORMATION STORAGE UNIT (Ce1, Ce2, SK1)
105
FIRST SESSION KEY GENERATION UNIT
106
FIRST ENCRYPTION UNIT
107
EMBEDDED DATA GENERATION UNIT
110
201
IMAGE PROCESSING DEVICE
206
200
207
COMMUNICATION UNIT
AUTHENTICATION UNIT
IMAGE RECOGNITION PROCESSING UNIT
208
OUTPUT UNIT
202
SECOND KEY GENERATION UNIT
203
SECOND KEY INFORMATION STORAGE UNIT (CPK2 + "PK1")
204
SECOND SESSION KEY GENERATION UNIT
205
SECOND ENCRYPTION UNIT
210

FIG. 4

INFORMATION PROCESSING DEVICE, INFORMATION PROCESSING METHOD, INFORMATION PROCESSING SYSTEM, AND COMPUTER PROGRAM

CROSS REFERENCE TO RELATED APPLICATIONS

This application is a national stage application under 35 U.S.C. 371 and claims the benefit of PCT Application No. PCT/JP2022/033511, having an international filing date of 7 Sep. 2022, which designated the United States, which PCT application claimed the benefit of U.S. Provisional Application No. 63/244,021, filed 14 Sep. 2021, the entire disclosures of each of which are incorporated herein by reference.

TECHNICAL FIELD

The present disclosure relates to an information processing device, an information processing method, an information processing system, and a computer program.

BACKGROUND ART

A system that analyzes an image captured by an in-vehicle camera and controls an operation of a vehicle is becoming widespread. In such a system, the image is transmitted from the in-vehicle camera to, for example, an image processing device mounted on the vehicle. The image processing device analyzes the image, and then the operation of the vehicle is controlled on the basis of the analysis result.

If the image transmitted from the in-vehicle camera to the image processing device is falsified in the system described above, there is a possibility that the vehicle is controlled to an undesired state.

Therefore, a technique is required for preventing falsification of the image transmitted from the in-vehicle camera to the image processing device. Various techniques for preventing such falsification have been proposed so far, and various improvements such as higher calculation efficiency and a higher security level are always required.

CITATION LIST

Patent Document

Patent Document 1: WO 2018/230366

SUMMARY OF THE INVENTION

Problems to be Solved by the Invention

The present disclosure has been made in view of the circumstance described above, and the present disclosure provides an information processing device, an information processing method, an information processing system, and a computer program capable of inhibiting falsification of data in an efficient manner at a high security level.

Solutions to Problems

An information processing device according to the present disclosure includes: a key information storage unit that holds a first key in advance; a communication unit that receives a second correspondence key corresponding to a second key from an external apparatus, the second key being different from the first key; a session key generation unit that generates a session key on the basis of the first key and the second correspondence key; and an encryption unit that generates, on the basis of the session key and data, coded information including at least one of authenticated information or encrypted information.

Another information processing device according to the present disclosure includes: a key information storage unit that obtains and holds a first correspondence key corresponding to a first key from an external apparatus or holds the first correspondence key corresponding to the first key in advance; a communication unit that transmits a second correspondence key, of a second key and the second correspondence key, to the external apparatus, the second key being different from the first key and the second correspondence key corresponding to the second key; a session key generation unit that generates a session key on the basis of the first correspondence key and the second key; and an encryption unit that generates, on the basis of the session key and data, coded information including at least one of authenticated information or encrypted information.

An information processing system according to the present disclosure includes:

- a first information processing device that includes: a first key information storage unit that holds a first key in advance; a first communication unit that receives a second correspondence key corresponding to a second key different from the first key from an external apparatus; a first session key generation unit that generates a session key on the basis of the first key and the second correspondence key; and a first encryption unit that generates, on the basis of the session key and data, first coded information including at least one of authenticated information or encrypted information, the session key being generated by the first session key generation unit; and
- a second information processing device that includes: a second key information storage unit that obtains and holds a first correspondence key corresponding to the first key from an external apparatus or holds the first correspondence key corresponding to the first key in advance; a second communication unit that transmits the second correspondence key, of the second key and the second correspondence key, to the external apparatus; a second session key generation unit that generates a session key on the basis of the first correspondence key and the second key; and a second encryption unit that generates, on the basis of the session key and data, second coded information including at least one of authenticated information or encrypted information, the session key being generated by the second session key generation unit, in which
- the second communication unit transmits the second correspondence key to the first communication unit, and
- authenticates whether or not the first coded information and the second coded information coincide with each other.

An information processing method according to the present disclosure which is an information processing method for an information processing device that holds a first key in advance includes: receiving a second correspondence key corresponding to a second key from an external apparatus, the second key being different from the first key; generating a session key on the basis of the first key and the second correspondence key; and generating, on the basis of the session key and data, coded information including at least one of authenticated information or encrypted information.

Another information processing method according to the present disclosure which is an information processing method for an information processing device that obtains and holds a first correspondence key corresponding to a first key from an external apparatus or holds the first correspondence key corresponding to the first key in advance includes: transmitting a second correspondence key, of a second key and the second correspondence key, to an external apparatus, the second key being different from the first key and the second correspondence key corresponding to the second key; generating a session key on the basis of the first correspondence key and the second key; and generating, on the basis of the session key and data, coded information including at least one of authenticated information or encrypted information.

Still another information processing method according to the present disclosure which is an information processing method between a first information processing device that holds a first key in advance and a second information processing device that obtains and holds a first correspondence key corresponding to the first key from an external apparatus or holds the first correspondence key corresponding to the first key in advance includes:

- transmitting, from the second information processing device to the first information processing device, a second correspondence key, of a second key different from the first key and the second correspondence key corresponding to the second key;
- generating, on the basis of the first key and the second correspondence key, a session key by the first information processing device;
- generating, on the basis of the session key and data, first coded information including at least one of authenticated information or encrypted information, the session key being generated by the first information processing device;
- generating, on the basis of the first correspondence key and the second key, a session key by the second information processing device;
- generating, on the basis of the session key and data, second coded information including at least one of authenticated information or encrypted information, the session key being generated by the second information processing device; and
- authenticating whether or not the first coded information and the second coded information coincide with each other.

A computer program according to the present disclosure causes a computer to execute the steps including: receiving a second correspondence key corresponding to a second key from an external apparatus, the second key being different from a first key; generating a session key on the basis of the first key and the second correspondence key; and generating, on the basis of the session key and data, coded information including at least one of authenticated information or encrypted information.

Another computer program according to the present disclosure causes a computer to execute the steps including: transmitting a second correspondence key corresponding to a second key to an external apparatus, the second key being different from a first key; generating a session key on the basis of a first correspondence key and the second key, the first correspondence key corresponding to the first key; and generating, on the basis of the session key and data, coded information including at least one of authenticated information or encrypted information.

BRIEF DESCRIPTION OF DRAWINGS

FIG. 2 is a block diagram illustrating functional configurations of an information processing system according to the embodiment.

FIG. 4 is a flowchart illustrating device authentication processing performed between the image sensor and the image processing device constituting the information processing system of FIG. 2.

MODE FOR CARRYING OUT THE INVENTION

Hereinafter, an embodiment of the present disclosure will be described in detail with reference to the drawings.

<Vehicle Including Information Processing System>

Figure 1:
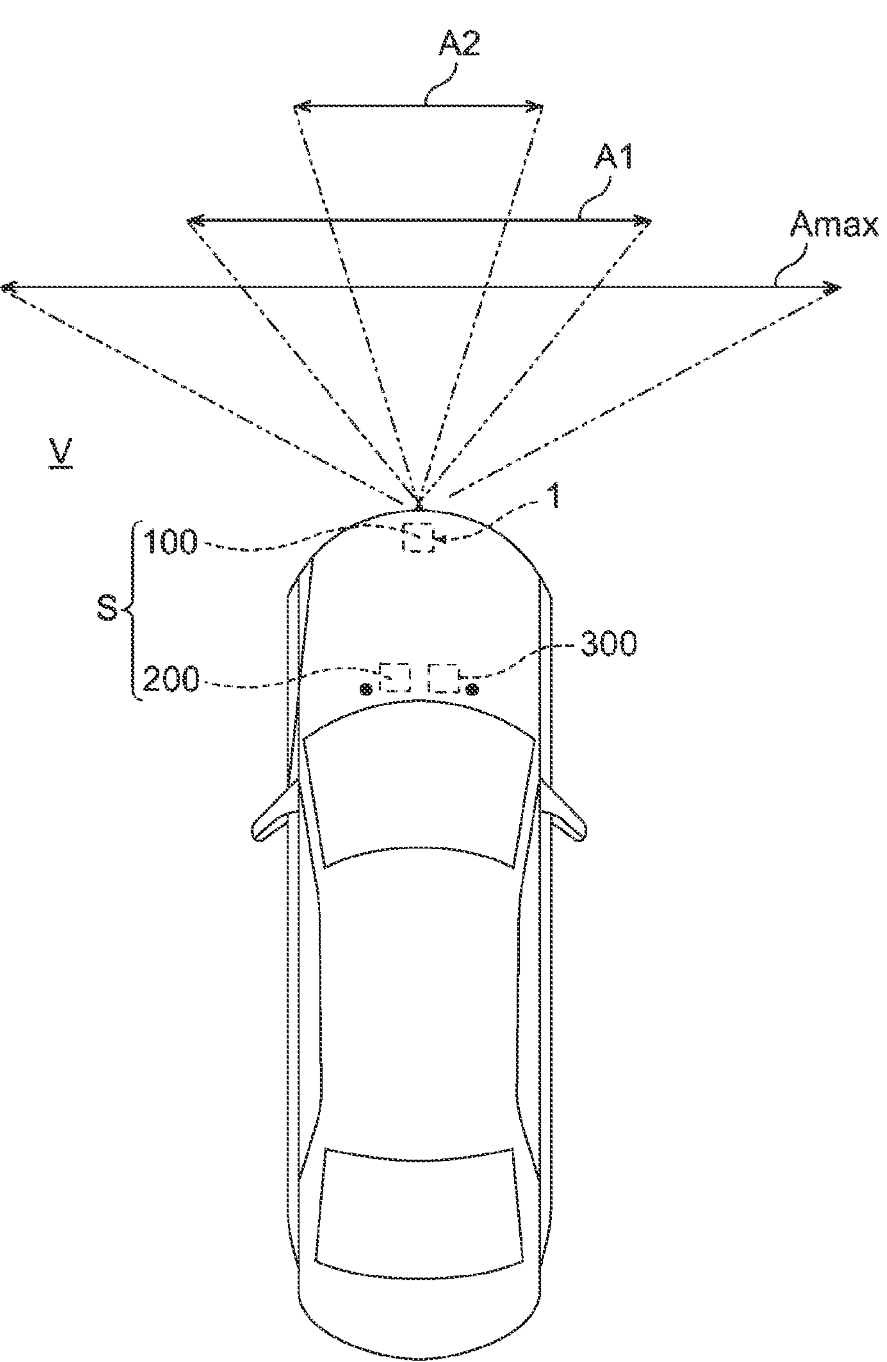
FIG. 1 is a diagram illustrating a vehicle including an information processing system according to an embodiment.

FIG. 1 is a diagram illustrating a vehicle V including an information processing system S according to an embodiment. The vehicle Vis an automobile, and includes a front view camera 1 at the front of the vehicle V. An image sensor 100 is built in the front view camera 1. The front view camera 1 captures light into the image sensor 100 from a lens (not illustrated) directed to the front of the vehicle. The front view camera 1 thus captures an image in front of the vehicle. The front view camera 1 may be attached to a vehicle interior side of a windshield.

The image sensor 100 provides the captured vehicle-front image, as image data, to an image processing device 200 inside the vehicle V. The image processing device 200 performs image analysis of the vehicle-front image on the basis of the provided image data, and provides the analysis result to a vehicle control device 300 inside the vehicle V. The vehicle control device 300 then controls operation of the vehicle on the basis of the result of the image analysis from the image processing device 200. The operation control of the vehicle may include, for example, braking, steering, accelerating, and the like.

The information processing system S according to the present embodiment includes the image sensor 100 and the image processing device 200. The information processing system S also has a function of preventing falsification of the image data communicated between the image sensor 100 and the image processing device 200. Note that the information processing system S according to the present embodiment subjects the image data to falsification prevention processing; however, the system may be applied to prevent falsification of other data such as voice data and measurement data. In this case, an audio sensor, a distance measuring sensor, or the like may be used instead of the image sensor 100.

Furthermore, in the present embodiment, the information processing system S includes the image sensor 100 that is built in the front view camera 1 and the image processing device 200. The information processing system S, however, may include an image sensor in a rear-view camera or a side camera and the image processing device 200. The information processing system S may also be applied to, in addition to an automobile, a motorcycle, a bicycle, an electric wheelchair, a train, a flying object, a robot, and the like.

Furthermore, a reference sign Amax in FIG. 1 indicates a maximum angle of view of the front view camera 1. The front view camera 1 is a monocular camera that captures an image of a relatively wide range. The image sensor 100 is capable of generating, from the image data generated in a case where an image is captured at the maximum angle of view, image data corresponding to a first angle of view A1 and image data corresponding to a second angle of view A2, for example. Note that configurations of such front view camera 1 is not particularly limited, and a configuration in which images of multiple angle of views are simultaneously captured by a camera that includes multiple lenses as a unit may be applied to the vehicle V and the information processing system S.

<Information Processing System>

FIG. 2 is a block diagram illustrating functional configurations of the information processing system S. FIG. 2 illustrates functional configurations of each of the image sensor 100 and the image processing device 200. The information processing system S is capable of performing authentication as to whether or not the image processing device 200 is connected to the correct image sensor 100 (device authentication). Thus, for example, replacement of a device can be detected. The information processing system S is also capable of performing authentication as to whether or not the image data received by the image processing device 200 has been correctly transmitted from the image sensor 100 (image authentication). Thus, falsification of the image data can be detected. Hereinafter, the image sensor 100 and the image processing device 200 will be described in detail.

(Image Sensor)

The image sensor 100 includes an image pickup unit 101, an image data generation unit 102, a communication unit 103, a first key information storage unit 104, a first session key generation unit 105, a first encryption unit 106, and an embedded data generation unit 107. Among them, the first key information storage unit 104, the first session key generation unit 105, the first encryption unit 106, and the embedded data generation unit 107 constitute a first encryption module 110.

The first encryption module 110 has a function of holding and generating information used for the device authentication and the image authentication. The first encryption module 110 may be configured, for example, in a semiconductor chip constituting the image data generation unit 102, or may be configured in a chip different from the semiconductor chip.

The image pickup unit 101 is an element that photoelectrically converts light from the lens. Specifically, the image pickup unit 101 is a pixel array constituted by multiple complementary metal oxides semiconductors (CMOSs); however, the image pickup unit 101 may include other elements such as a charge coupled device (CCD).

The image data generation unit 102 generates the image data by A/D converting an analog signal generated by the image pickup unit 101. The image sensor 100 is capable of capturing still images and moving images. In a case where the image sensor 100 captures a still image, the image data generation unit 102 generates a piece of image data corresponding to a still image. In a case where the image sensor 100 captures a moving image, the image data generation unit 102 sequentially generates a plurality of pieces of continuous image data at a set frame rate.

The image data generation unit 102 is also capable of generating one or a plurality of pieces of divided image data from one piece of image data, in accordance with an instruction from the image processing device 200. The divided image data refers to, for example, image data corresponding to the first angle of view A1 and image data corresponding to the second angle of view A2, which can be generated from the image data obtained when an image is captured at the maximum angle of view illustrated in FIG. 1. Note that in the following description, in a case where simply referred to as image data, both the image data which is the basis of the divided image data and the divided image data are included unless otherwise specified.

The communication unit 103 transmits information to an external apparatus, specifically to the image processing device 200, and receives information from an external apparatus, specifically from the image processing device 200. More specifically, the communication unit 103 transmits various types of information, such as image data generated by the image data generation unit 102, to the image processing device 200. The communication unit 103 may communicate with the external apparatus wirelessly or by wire.

In the first encryption module 110, the first key information storage unit 104 holds in advance a first secret key PK1 as a first key, a first certificate authority certificate Ce1, and a second certificate authority certificate Ce2. In the present embodiment, as an example, a first secret key SK1, the first certificate authority certificate Ce1, and the second certificate authority certificate Ce2 are written to the first key information storage unit 104 by the manufacturer of the image sensor 100 before shipment. Note that the writing procedure will be described later.

The first secret key SK1 is provided from the first key information storage unit 104 to the first session key generation unit 105 at the time of the image authentication. The first session key generation unit 105 generates a session key on the basis of the first secret key SK1 and a second public key PK2 received from the external apparatus. Specifically, the second public key PK2 is transmitted from the image processing device 200 to the communication unit 103 of the image sensor 100, and is provided to the first session key generation unit 105 through the communication unit 103. The first session key generation unit 105 then provides the generated session key to the first encryption unit 106.

The first secret key SK1 is a piece of information generated together with the corresponding (the paired) first public key PK1. The first public key PK1 can be used to encrypt information, and in this case, the first secret key SK1 can be used to decrypt the information encrypted using the first public key PK1. The second public key PK2 is also a piece of information generated together with the corresponding second secret key SK2. In addition, the second public key PK2 can also be used to encrypt information, and in this case, the second secret key SK2 can be used to decrypt the information encrypted using the second public key SK2. That is, in the present embodiment, the first secret key SK1 and the second secret key SK2 have a first attribute for performing decoding, which is one of encoding or decoding. The first public key PK1 and the second public key PK2 have, on the other hand, a second attribute for performing encoding (encryption), which is the other of the encoding or the decoding.

Here, the first secret key SK1 and the first public key PK1 and the second secret key SK2 and the second public key PK2 are generated so as to have a relationship in which a common key (a session key) is generated in a case where the secret keys or the public keys are exchanged and multiplied with each other. That is, the first secret key SK1 and the first public key PK1 and the second secret key SK2 and the second public key PK2 are generated so as to establish a relationship in which a key generated by multiplying the first secret key SK1 and the second public key PK2 and a key generated by multiplying the second secret key SK2 and the first public key PK1 are the same.

Specifically, in the present embodiment, the first secret key SK1 and the first public key PK1 and the second secret key SK2 and the second public key PK2 are generated in accordance with elliptic curve cryptography. More specifically, the first secret key SK1 and the first public key PK1 and the second secret key SK2 and the second public key PK2 are generated, in accordance with elliptic curve cryptography, using the same elliptic curve defining the same base point.

More specifically, the first session key generation unit 105 generates a session key by multiplying the first secret key SK1 and the second public key PK2 based on elliptic curve cryptography as described above. The session key generated in this manner is also generated by multiplying the first public key PK1 and the second secret key SK2. The session key generated in this manner can function as if it is a new public key. In addition, the session key can be used for encryption.

Furthermore, the first certificate authority certificate Ce1 and the second certificate authority certificate Ce2 are transmitted to the image processing device 200 through the communication unit 103 at the time of the device authentication.

As described in detail later, the first certificate authority certificate Ce1 is a piece of certificate information encrypted using a first certificate authority secret key CSK1 generated by a first certificate authority CA1. Specifically, the first certificate authority certificate Ce1 is information obtained by encrypting, using the first certificate authority secret key CSK1, the unencrypted first certificate authority certificate in which the first public key PK1 is stored. The second certificate authority certificate Ce2 is, on the other hand, a piece of certificate information encrypted using a second certificate authority secret key CSK2 generated by a second certificate authority CA2 which is different from the first certificate authority CA1. Specifically, the second certificate authority certificate Ce2 is a piece of encrypted information obtained by encrypting, using the second certificate authority secret key CSK2, the unencrypted second certificate authority certificate which stores a first certificate authority public key CPK1 for decrypting the information encrypted using the first certificate authority secret key CSK1 described above. The first certificate authority certificate Ce1 and the second certificate authority certificate Ce2 are decrypted at the time of the device authentication, and the stored information is extracted. This will be described later in detail.

The first encryption unit 106 is provided with the session key generated by the first session key generation unit 105, and is provided with the image data from the image data generation unit 102. The first encryption unit 106 then generates coded information including at least one of authenticated information or encrypted information, on the basis of the session key and the image data.

The coded information may be, for example, a message authentication code (MAC) which is a piece of authenticated information generated by, using the session key described above, converting the image data with a MAC algorithm. The MAC algorithm is not particularly limited, and may include, for example, a cipher-based message authentication code (CMAC), a hash-based message authentication code (HMAC), or the like. Alternatively, the coded information may be, for example, a piece of encrypted information obtained by encrypting the image data using elliptic curve cryptography using the session key described above. The coded information may include both authenticated information and encrypted information. Note that in this specification, authenticated information means information that is undecryptable, in other words, information that is not planned to be decrypted, and encrypted information means information that is decryptable.

The first encryption unit 106 may convert a part of the image data to authenticated information or encrypted information, or may convert the entire image data to authenticated information or encrypted information. In a case where the entire image data is converted to authenticated information or encrypted information, however, the calculation load may increase excessively. It is therefore desirable to convert a part of the image data to authenticated information or encrypted information. In a case where a part of the image data is converted, a range of information to be converted may be determined in advance. Alternatively, a part of the image data to be converted may be determined randomly using a random number.

In a case where multiple pieces of the coded information are generated from the same image data in accordance with a common session key and the same encryption or encoding algorithm, multiple pieces of the same coded information are obtained. In a case where multiple pieces of the coded information are separately generated from different pieces of the image data by the first encryption unit 106, on the other hand, different pieces of information are obtained. As described above, the image data generation unit 102 is capable of generating a plurality of pieces of the divided image data from one piece of image data. In the case where the image data generation unit 102 generates, for example, the plurality of pieces of divided image data, the first encryption unit 106 is provided with the plurality of pieces of divided image data at the same timing. At this time, the first encryption unit 106 generates the coded information from each divided image data using a common session key; however, the multiple pieces of the coded information generated in correspondence with each divided image data are different from each other.

The embedded data generation unit 107 is provided with the coded information generated by the first encryption unit 106 in the manner described above, and is provided with the image data from the image data generation unit 102. The embedded data generation unit 107 then embeds the coded information in the image data. Embedding the coded information in the image data means generating information in which the coded information is added, to the image data, integrally with the image data or by replacing a partial region of the image data with the coded information. The embedded data generation unit 107 then transmits the image data embedded with the coded information to the communication unit 103.

In the present embodiment, the communication unit 103 transmits, to the image processing device 200, the image data embedded with the coded information from the embedded data generation unit 107 and an unprocessed image data generated by the image data generation unit 102. Note that in the present embodiment, the coded information is transmitted to the image processing device 200 by transmitting the image data in which the coded information is embedded. Instead of this, however, only a single piece of the coded information and the unprocessed image data may be transmitted to the image processing device 200.

(Image Processing Device)

Hereinafter, the image processing device 200 will be described. The image processing device 200 includes a communication unit 201, a second key generation unit 202, a second key information storage unit 203, a second session key generation unit 204, a second encryption unit 205, an authentication unit 206, an image recognition processing unit 207, and an output unit 208. Among them, the second key generation unit 202, the second key information storage unit 203, the second session key generation unit 204, and the second encryption unit 205 constitute a second encryption module 210.

The second encryption module 210 has a function of holding and generating information used for the device authentication and the image authentication described above. The second encryption module 210 may be configured, for example, in a semiconductor chip constituting the image recognition processing unit 207 or the like, or may be configured in a chip different from the semiconductor chip.

The communication unit 201 transmits information to an external apparatus, specifically to the image sensor 100, and receives information from an external apparatus, specifically from the image sensor 100. More specifically, the communication unit 201 transmits the second public key PK2, which is used at the time the image sensor 100 generates the session key as described above, to the image sensor 100. The communication unit 201 also receives, from the image sensor 100, the image data and the foregoing coded information corresponding to the image data. The communication unit 201 may communicate with the external apparatus wirelessly or by wire.

In the second encryption module 210, the second key generation unit 202 serves as a functional unit that generates the second public key PK2 and the corresponding second secret key SK2. In the present embodiment, the second key generation unit 202 generates the second secret key SK2 and the second public key PK2 in accordance with elliptic curve cryptography. Specifically, the second key generation unit 202 generates the second public key PK2 and the second secret key SK2, on the basis of an elliptic curve used at the time the first secret key SK1 and the first public key PK1 are generated by elliptic curve cryptography, from the base point set in the elliptic curve.

In the present embodiment, the second key generation unit 202 includes, for example, a random number generator which generates a random number for each piece of image data as the second secret key SK2, and the second public key PK2 is generated using the second secret key SK2. That is, the second key generation unit 202 may generate a pair of the second secret key SK2 and the second public key PK2 different for each piece of image data planned to be transmitted. In this case, the pair of the second secret key SK2 and the second public key PK2 may be generated in correspondence with the frame rate of the image data generated by the image sensor 100.

The second key generation unit 202 provides the communication unit 201 with the second public key PK2 generated as described above. The second public key PK2 is then transmitted to the image sensor 100 through the communication unit 201. The second key generation unit 202, on the other hand, provides the second secret key SK2 to the second session key generation unit 204. Note that in the present embodiment, the second public key PK2 and the second secret key SK2 are generated in the image processing device 200 by the second key generation unit 202; however, the second public key PK2 and the second secret key SK2 may be obtained from the external device by the image processing device 200.

The second key information storage unit 203 holds a second certificate authority public key CPK2 for decrypting the second certificate authority certificate Ce2 when the second certificate authority certificate Ce2 is provided from the image sensor 100. In the present embodiment, as an example, the second certificate authority public key CPK2 is written to the second key information storage unit 203 by the manufacturer of the image processing device 200 before shipment. When the second certificate authority certificate Ce2 is provided from the image sensor 100 to the image processing device 200 at the time of the device authentication, the second key information storage unit 203 provides the second certificate authority public key CPK2 to the authentication unit 206.

As described above, the second certificate authority certificate Ce2 stores the first certificate authority public key CPK1 for decrypting the information encrypted using the first certificate authority secret key CSK1. As described in detail later, the authentication unit 206 decrypts the second certificate authority certificate Ce2 with the second certificate authority public key CPK2 held in the second key information storage unit 203. As a result, the first certificate authority public key CPK1 is obtained. Here, the image processing device 200 is also provided, from the image sensor 100 at the time of the device authentication, with the first certificate authority certificate Ce1 encrypted using the first certificate authority secret key CSK1. The first certificate authority certificate Ce1 is decrypted using the first certificate authority public key CPK1 obtained as described above. In addition, the first certificate authority certificate Ce1 is encrypted with the first public key PK1 being stored, so that the first public key PK1 is obtained when the first certificate authority certificate Ce1 is decrypted.

The first public key PK21 obtained as described above is held in the second key information storage unit 203. In the present embodiment, the first public key PK1 is stored in the first certificate authority certificate Ce1 transmitted from the external apparatus, that is, the image sensor 100, so that the image processing device 200 obtains and holds the first public key PK1 from the external apparatus. The first public key PK1 may, however, be held in the second key information storage unit 203 in advance.

The second session key generation unit 204 is provided with the second secret key SK2 from the second key generation unit 202, and is provided with the first public key PK1 obtained by stepwise decryption of the second certificate authority certificate Ce1 and the first certificate authority certificate C2 described above. The second session key generation unit 204 then generates a session key on the basis of the second secret key SK2 and the first public key PK1. The second session key generation unit 204 then provides the generated session key to the second encryption unit 205.

Here, as described above, the first secret key SK1 and the first public key PK1 and the second secret key SK2 and the second public key PK2 are generated so as to have a relationship in which a common key (a session key) is generated in a case where the secret keys or the public keys are exchanged and multiplied with each other. The session key generated by the second session key generation unit 204 is thus the same as the session key generated by the first session key generation unit 105.

The second encryption unit 205 is then provided with the session key generated by the second session key generation unit 204, and is provided with the image data transmitted from the image sensor 100 to the communication unit 201. The second encryption unit 205 then generates the coded information including at least one of authenticated information or encrypted information, on the basis of the session key and the image data.

An algorithm by which the second encryption unit 205 generates the coded information is the same as the algorithm by which the first encryption unit 106 in the image sensor 100 generates the coded information. In addition, as described above, the session key generated by the second session key generation unit 204 is the same as the session key generated by the first session key generation unit 105. Therefore, if the image data used at the time the second encryption unit 205 generates the coded information is the same as the image data used at the time the first encryption unit 106 generates the coded information, the coded information generated by the second encryption unit 205 is the same as the coded information generated by the first encryption unit 106.

The algorithm used when the second encryption unit 205 generates the coded information is CMAC, HMAC, elliptic curve cryptography, or the like, which are exemplified as algorithms that can be employed by the first encryption unit 106; therefore, a detailed description thereof will be omitted. The second encryption unit 205 then provides the generated coded information to the authentication unit 206. Here, similar to the embedded data generation unit 107 in the image sensor 100, the second encryption unit 205 may provide the authentication unit 206 with the image data in which the coded information is embedded.

The authentication unit 206 performs the device authentication and the image authentication. As described, the device authentication is performed to authenticate whether or not the image processing device 200 is connected to the correct image sensor 100. Also, the image authentication is performed to authenticate whether or not the image data received by the image processing device 200 has been correctly transmitted from the image sensor 100.

The authentication unit 206 according to the present embodiment performs the device authentication by two-stage authentication. At the time of the device authentication, the authentication unit 206 is firstly provided, through the communication unit 201, with the first certificate authority certificate Ce1 and the second certificate authority certificate Ce2 transmitted from the image sensor 100. At this time, the authentication unit 206 is also provided with the second certificate authority public key CPK2 from the second key information storage unit 203. Then, the authentication unit 206 first decrypts the second certificate authority certificate Ce2 using the second certificate authority public key CPK2. Here, the second certificate authority certificate Ce2 stores the first certificate authority public key CPK1, so that the first certificate authority public key CPK1 can be obtained in a case where the decryption is successfully performed. As a result, the first-stage authentication is completed.

Then, when the first certificate authority public key CPK1 is obtained, the authentication unit 206 decrypts the first certificate authority certificate Ce1 using the first certificate authority public key CPK1. Here, the first certificate authority certificate Ce1 stores the first public key PK1, so that the first public key PK1 can be obtained in a case where the decryption is successfully performed. As a result, the second-stage authentication is completed. The authentication unit 206 then determines that the correct image sensor 100 is connected to the image processing device 200 by the fact that the two-stage authentication is completed.

Furthermore, at the time of the image authentication, the authentication unit 206 is provided with the image data, embedded with the coded information, transmitted from the image sensor 100, and is provided with the coded information generated by the second encryption unit 205. The authentication unit 206 then compares the coded information embedded in the image data from the image sensor 100 with the coded information generated by the second encryption unit 205, and determines that the image data received by the image processing device 200 is correctly transmitted from the image sensor 100 in the case where the coded information coincides with the coded information.

In a case where the coded information embedded in the image data from the image sensor 100 and the coded information generated by the second encryption unit 205 do not coincide with each other, on the other hand, the authentication unit 206 determines that the image data transmitted from the image sensor 100 is incorrect. In a case where the two pieces of the coded information do not coincide with each other, there is a possibility, for example, that falsification such as replacement or change is made on the image data on the way from the image sensor 100 to the image processing device 200. In the case where the two pieces of the coded information do not coincide with each other, therefore, the authentication unit 206 determines that the image data transmitted from the image sensor 100 is incorrect.

In the present embodiment, the image authentication by the authentication unit 206 is performed for each piece of image data provided from the image sensor 100 to the image processing device 200. In the case where the two pieces of the coded information coincide with each other by the image authentication, the authentication unit 206 provides the image recognition processing unit 207 with the unprocessed image data received by the communication unit 201 together with the image data in which the coded information is embedded.

The image recognition processing unit 207 performs image analysis on the provided image data. The image analysis detects, for example, a person, a forward vehicle, and the like. The image recognition processing unit 207 then outputs the result of the image analysis to the output unit 208. The output unit 208 then outputs the result of the image analysis to the vehicle control device 300.

<Writing Information to Image Sensor and Image Processing Device>

Hereinafter, a procedure of writing information to the image sensor 100 and the image processing device 200 will be described with reference to FIG. 3. As described above, the first secret key SK1, the first certificate authority certificate Ce1, and the second certificate authority certificate Ce2 are written in advance to the first key information storage unit 104 of the image sensor 100. Furthermore, the second certificate authority public key CPK2 is written in advance to the second key information storage unit 203 of the image processing device 200. Note that the following writing procedure is an example, and the subject and timing of writing information are not limited to those described below.

Figure 3:
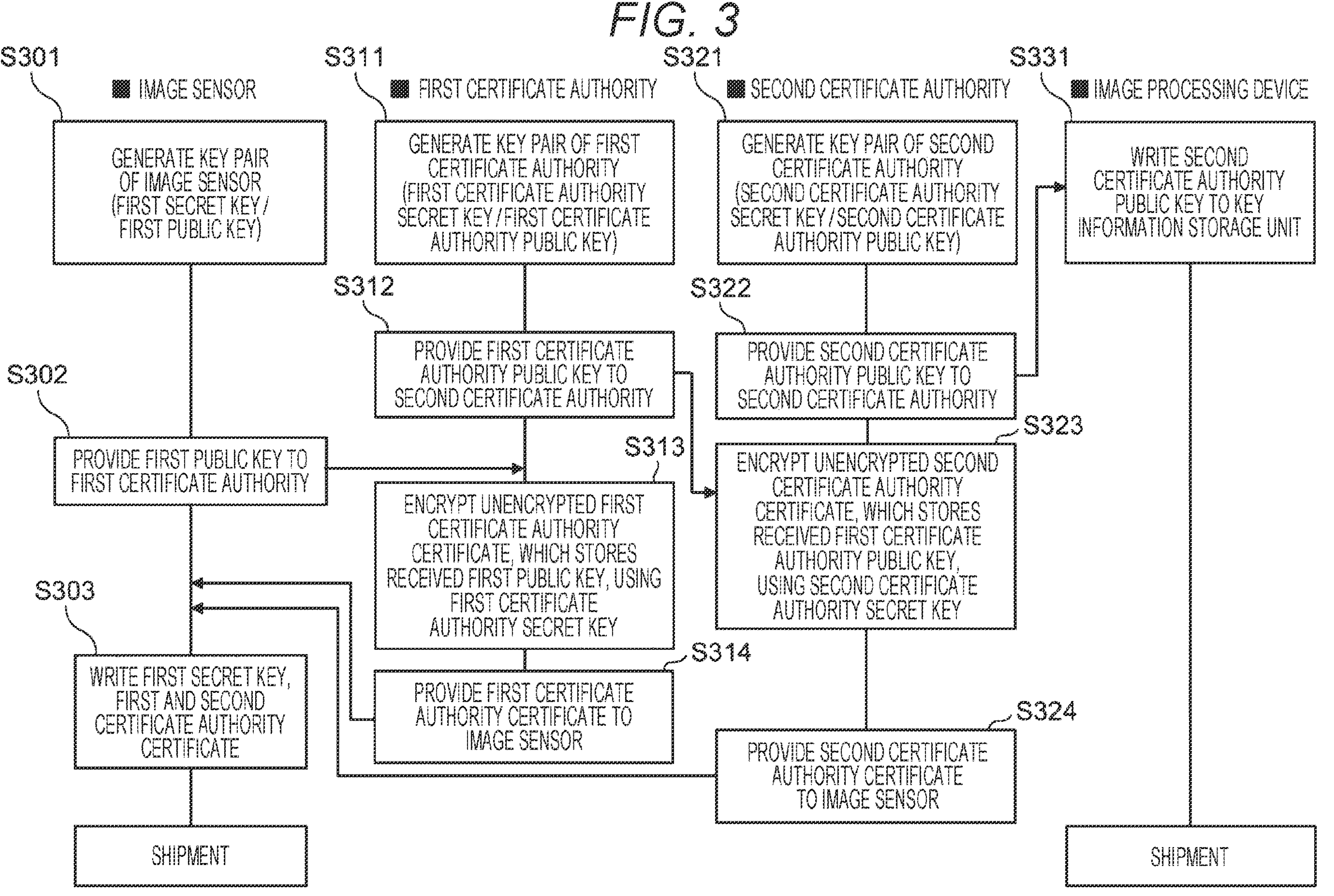
FIG. 3 is a diagram illustrating a procedure of writing information to an image sensor and an image processing device constituting the information processing system of FIG. 2.

In FIG. 3, processing performed by the image sensor 100 is illustrated under the notation "image sensor". Processing performed by the first certificate authority CA1 is illustrated under the notation "first certificate authority". Processing performed by the second certificate authority CA2 is illustrated under the notation "second certificate authority". Processing performed by the image processing device 200 is illustrated under the notation "image processing device".

In the present embodiment, as an example, the manufacturer of the image sensor 100 and the image processing device 200 writes desired information in the image sensor 100 and the image processing device 200 before shipment. The first certificate authority CA1 and the second certificate authority CA2 may be, for example, a computer owned by the manufacturer. The first certificate authority CA1 and the second certificate authority CA2 each has a function of generating a secret key for encryption and a public key, corresponding to the secret key, for decryption. However, the first certificate authority CA1 and the second certificate authority CA2 are not particularly limited, and may be an external organization or the like that provides a key to the manufacturer.

At the time of writing information, first, a key pair (the first secret key SK1 and the first public key PK1) unique to the image sensor 100 is generated as shown in step S301.

As shown in step S311, the first certificate authority CA1 generates a key pair (the first certificate authority secret key CSK1 and the first certificate authority public key CPK1) unique to the first certificate authority CA1.

As shown in step S321, the second certificate authority CA2 generates a key pair (the second certificate authority secret key CSK2 and the second certificate authority public key CPK2) unique to the second certificate authority CA2.

In the present embodiment, the manufacturer generates the key pair unique to the image sensor 100 by a computer or the like, which is different from the image sensor 100. The first public key PK1, of the first secret key SK1 and the first public key PK1, is then provided to the first certificate authority CA1 as shown in step S302. The first secret key SK1 is, on the other hand, held in the image sensor 100.

Furthermore, the first certificate authority CA1 provides the first certificate authority public key CPK1, of the first certificate authority secret key CSK1 and the first certificate authority public key CPK1, to the second certificate authority CA2 as shown in step S312. The first certificate authority CA1, on the other hand, encrypts the unencrypted first certificate authority certificate, which stores the first public key PK1 from the image sensor 100, using the first certificate authority secret key CSK1 as shown in step S313, and generates the first certificate authority certificate Ce1. Thereafter, as shown in step S314, the first certificate authority CA1 provides the first certificate authority certificate Ce1 to the image sensor 100.

Furthermore, the second certificate authority CA2 provides the second certificate authority public key CPK2, of the second certificate authority secret key CSK2 and the second certificate authority public key CPK2, to the image processing device 200 as shown in step S322. The second certificate authority CA2, on the other hand, encrypts the unencrypted second certificate authority certificate, which stores the first certificate authority public key CPK1 from the first certificate authority CA1, using the second certificate authority secret key CSK2 as shown in step S323, and generates the second certificate authority certificate Ce2. Thereafter, as shown in step S324, the second certificate authority CA2 provides the second certificate authority certificate Ce2 to the image sensor 100.

As described above, after the image sensor 100 is provided with the first certificate authority certificate Ce1 from the first certificate authority CA1 and the second certificate authority certificate Ce2 from the second certificate authority CA2, the first secret key SK1, the first certificate authority certificate Ce1, and the second certificate authority certificate Ce2 are written to the first key information storage unit 104 as shown in step S303. Thereafter, the image sensor 100 is shipped.

On the other hand, after being provided with the second certificate authority public key CPK2 from the second certificate authority CA1, the image processing device 200 writes the second certificate authority public key CPK2 to the second key information storage unit 203 as shown in step S331. Thereafter, the image processing device 200 is shipped.

As described above, the image sensor 100 and the image processing device 200 are each written with correlative information necessary for the device authentication and the image authentication. Therefore, the image sensor 100 and the image processing device 200 are capable of performing the device authentication and the image authentication when communicating with each other.

<Authentication Processing Between Devices>

Figure 4:
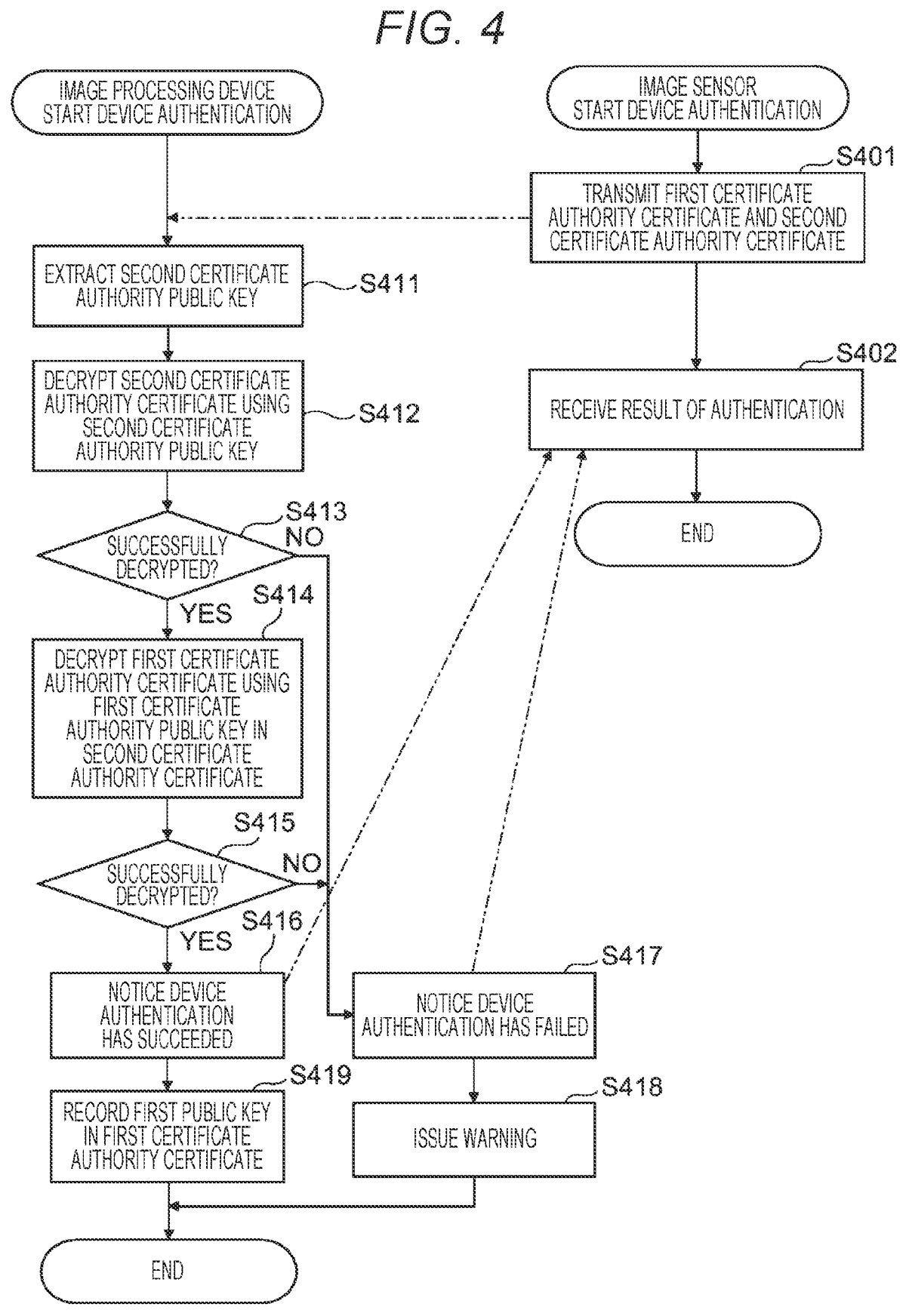

Next, device authentication processing between the image sensor 100 and the image processing device 200 in the information processing system S will be described. FIG. 4 is a flowchart illustrating the device authentication processing.

The device authentication starts, for example, when the image sensor 100 and the image processing device 200 start operating. When the device authentication starts, first in step S401, the image sensor 100 transmits the held first certificate authority certificate Ce1 and the second certificate authority certificate Ce2 to the image processing device 200.

After receiving the first certificate authority certificate Ce1 and the second certificate authority certificate Ce2, the image processing device 200 extracts the held second certificate authority public key CPK2 in step S411. The image processing device 200 then decrypts the second certificate authority certificate Ce2 using the second certificate authority public key CPK2 in step S412. Specifically, the decryption of the second certificate authority certificate Ce2 is performed by the authentication unit 206.

The image processing device 200 then determines whether or not the decryption is successful in step S413. In a case where the decryption is successful, the first certificate authority public key CPK1 stored in the second certificate authority certificate Ce2 is obtained. The image processing device 200 then decrypts, by the authentication unit 206, the first certificate authority certificate Ce1 using the first certificate authority public key CPK1 in step S414. The image processing device 200 then determines whether or not the decryption is successful in step S415.

In a case where it is determined that the decryption is successful in step S415, the image processing device 200 transmits the fact that the device authentication is successful to the image sensor 100 in step S416. In a case where decryption fails in step S413 and step S415, on the other hand, the image processing device 200 transmits the fact that the device authentication has failed to the image sensor 100 in step S417. Thereafter, a warning is notified in step S418, and the processing ends (END). The notification that the device authentication has succeeded or failed is input to the image sensor 100 in step S402. The image sensor 100 may stop operating in a case where the failure notification is received.

In addition, in the case where the decryption is successful in step S415, it is determined that the image processing device 200 is connected to the correct image sensor 100, which allows subsequent transmission and reception of image data. In addition, in step S419 which is performed in the case where the decryption is successful in step S415, the image processing device 200 records, for example in the second key information storage unit 203, the first public key PK1 obtained by decrypting the first certificate authority certificate Ce1. The image authentication becomes possible by obtaining the first public key PK1 in this manner.

<Image Authentication Processing>

Figure 5:
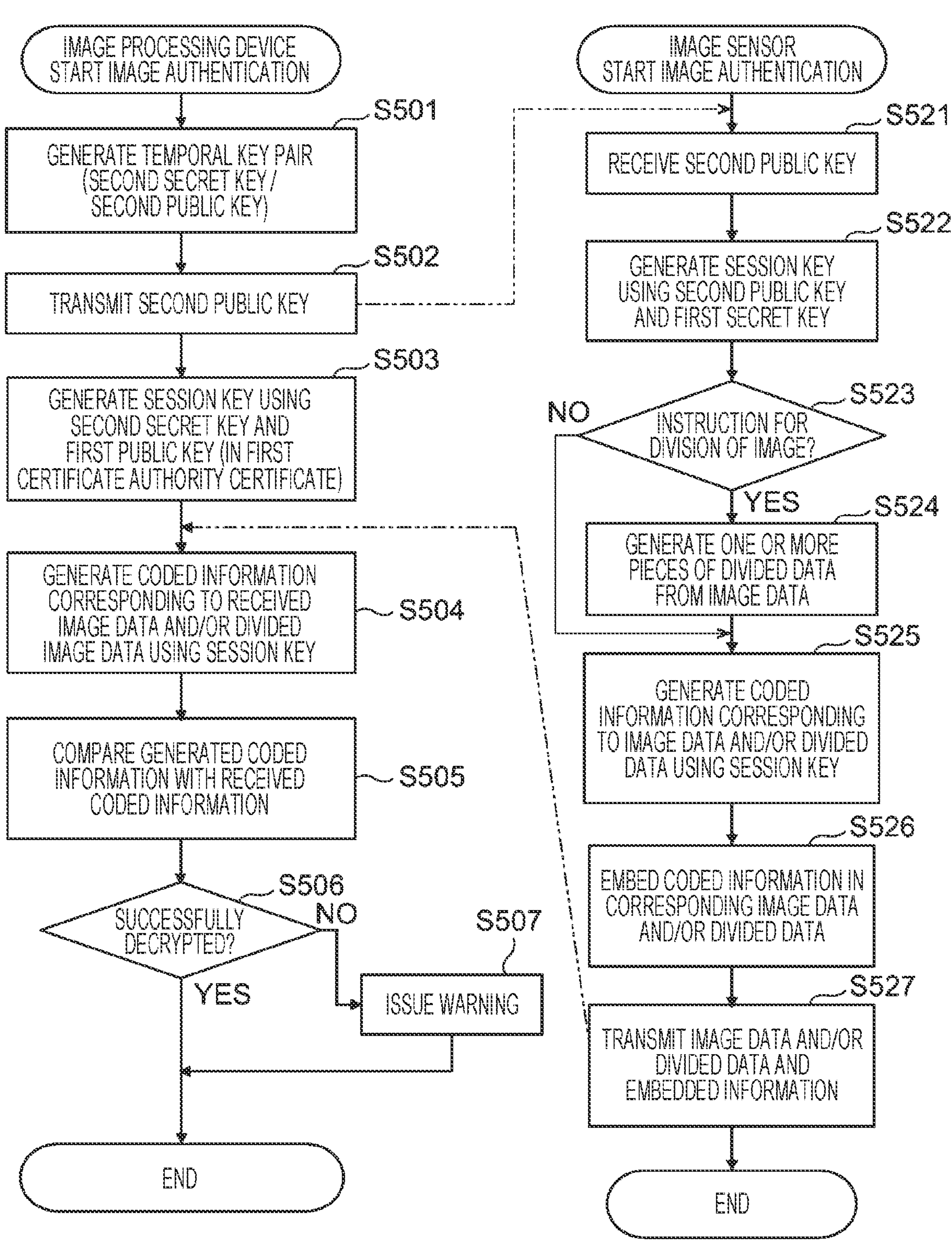
FIG. 5 is a flowchart illustrating image authentication processing performed between the image sensor and the image processing device constituting the information processing system of FIG. 2.

After the device authentication described above succeeds, the image authentication between the image sensor 100 and the image processing device 200 can be performed. FIG. 5 is a flowchart illustrating image authentication processing performed between the image sensor 100 and the image processing device 200.

In the image authentication, first, in step S501, the image processing device 200 generates, by the second key generation unit 202, the second secret key SK2 and the second public key PK2 as a temporal key pair. Subsequently, in step S502, the image processing device 200 transmits the second public key PK2 to the image sensor 100. The second secret key SK2 and the second public key PK2 are generated, for example, in correspondence with the frame rate of the image data generated by the image sensor 100. In this case, before transmitting the image data generated by the image sensor 100 which is to be subjected to the image authentication to the image processing device 200, the second secret key SK2 and the second public key PK2 are generated, of which the second public key PK2 is transmitted to the image sensor.

Thereafter, in step S503, the image processing device 200 generates a session key by the second session key generation unit 204 using the second secret key SK2 and the first public key PK1 obtained and held due to the success of the device authentication. The image processing device 200 then waits until the image data or the like to be authenticated is transmitted from the image sensor 100.

When the second public key PK2 is transmitted from the image processing device 200 to the image sensor 100 in step 501, on the other hand, the image sensor 100 receives the second public key PK2 in step S521. The image sensor 100 then generates, by the first session key generation unit 105, a session key on the basis of the first secret key SK1 and the received second public key PK2 in step S522.

Thereafter, the image sensor 100 determines whether or not there is a division instruction of the image data in step S523. In a case where it is confirmed that there is a division instruction, one or the plurality of pieces of divided image data is generated from one piece of the image data by the image data generation unit 102 in step S524, and proceeds to the processing in step S525. Furthermore, in a case where no division instruction is confirmed in step S523, the process proceeds from step S523 to step S525.

Then, in step S525, the image sensor 100 generates the coded information by the first encryption unit 106, on the basis of the session key and the image data. Here, in a case where the divided image data is generated, the coded information is generated for the divided image data. Note that in a case where the image data and the divided image data are transmitted to the image processing device 200, the coded information generated for the image data and the coded information generated for the divided image data are different from each other. Furthermore, in a case where the plurality of pieces of divided image data is transmitted, each piece of the coded information generated for the plurality of pieces of divided image data are different from each other.

Thereafter, in step S526, the image sensor 100 generates embedded information in which the coded information is embedded in the image data and/or the divided image data by the embedded data generation unit 107. Thereafter, in step S527, the image sensor 100 transmits, to the image processing device 200, the image data (the embedded information) in which the coded information generated in step S526 is embedded and the unprocessed image data and/or the divided image data. Then, the processing of the image sensor 100 ends (END).

Then, after the image data and/or the divided image data and the image data and/or the divided image data in which the corresponding coded information is embedded are transmitted from the image sensor 100 to the image processing device 200 in step S527, the image processing device 200 generates the coded information in step S504. Specifically, the image processing device 200 generates, on the basis of the session key generated by the second session key generation unit 204 in step S503 and the unprocessed image data and/or the divided image data, the coded information by the second encryption unit 205.

In step S505, next, the image processing device 200 compares, by the authentication unit 206, the coded information embedded in the image data from the image sensor 100 with the coded information generated by the second encryption unit 205. Then, in a case where the coded information generated by the image sensor 100 coincides with the coded information generated by the image processing device 200, the image processing device 200 determines that the image data received by the image processing device 200 has been correctly transmitted from the image sensor 100 (YES in step S506), that is, step S506 determines that the authentication is successful. Then, the image authentication processing ends (END).

In a case where the two pieces of coded information is not confirmed to coincide with each other in step S506 (NO in step S506), on the other hand, the authentication unit 206 determines that the image data transmitted from the image sensor 100 is incorrect. In this case, after a warning is notified in step S507, the image authentication processing ends (END). In this case, no image data is transmitted from the image processing device 200 to the vehicle control device 300.

Figure 6:
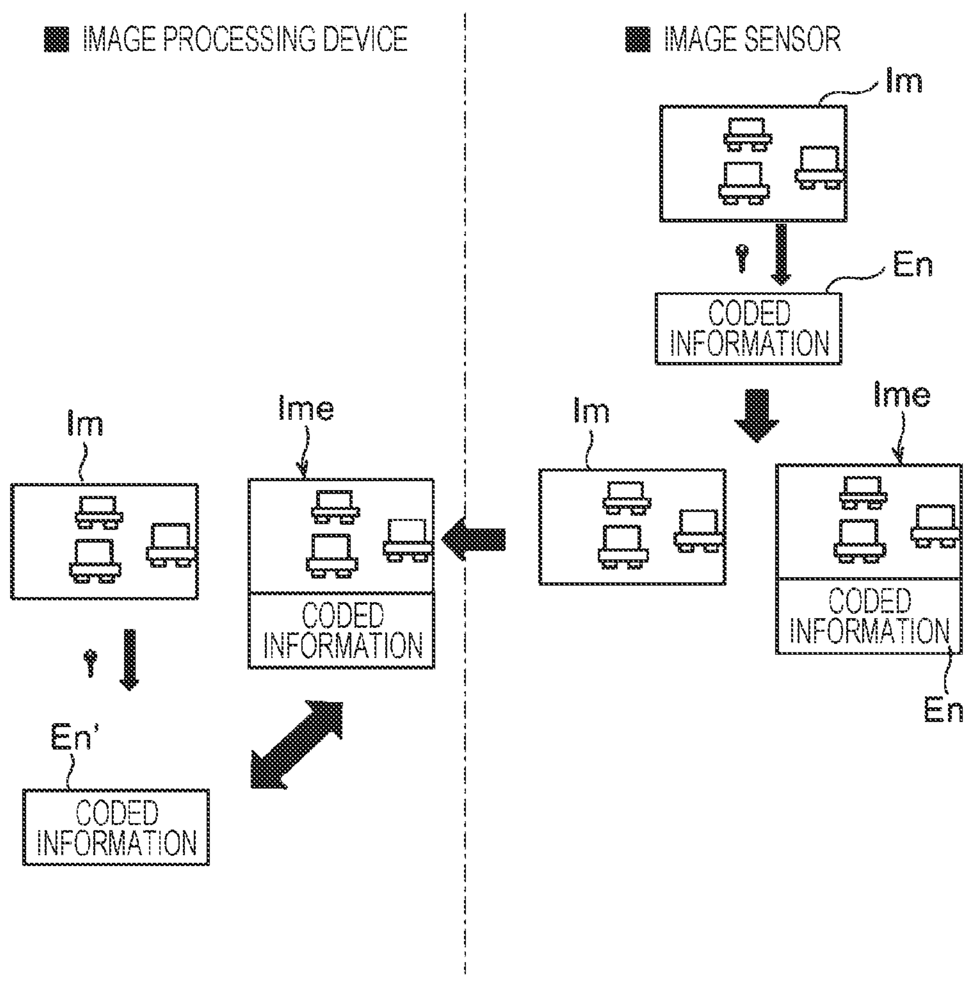
FIG. 6 is a diagram conceptually illustrating coded information generated by the image sensor and coded information generated by the image processing device in the processing of FIG. 5.
Figure 7:
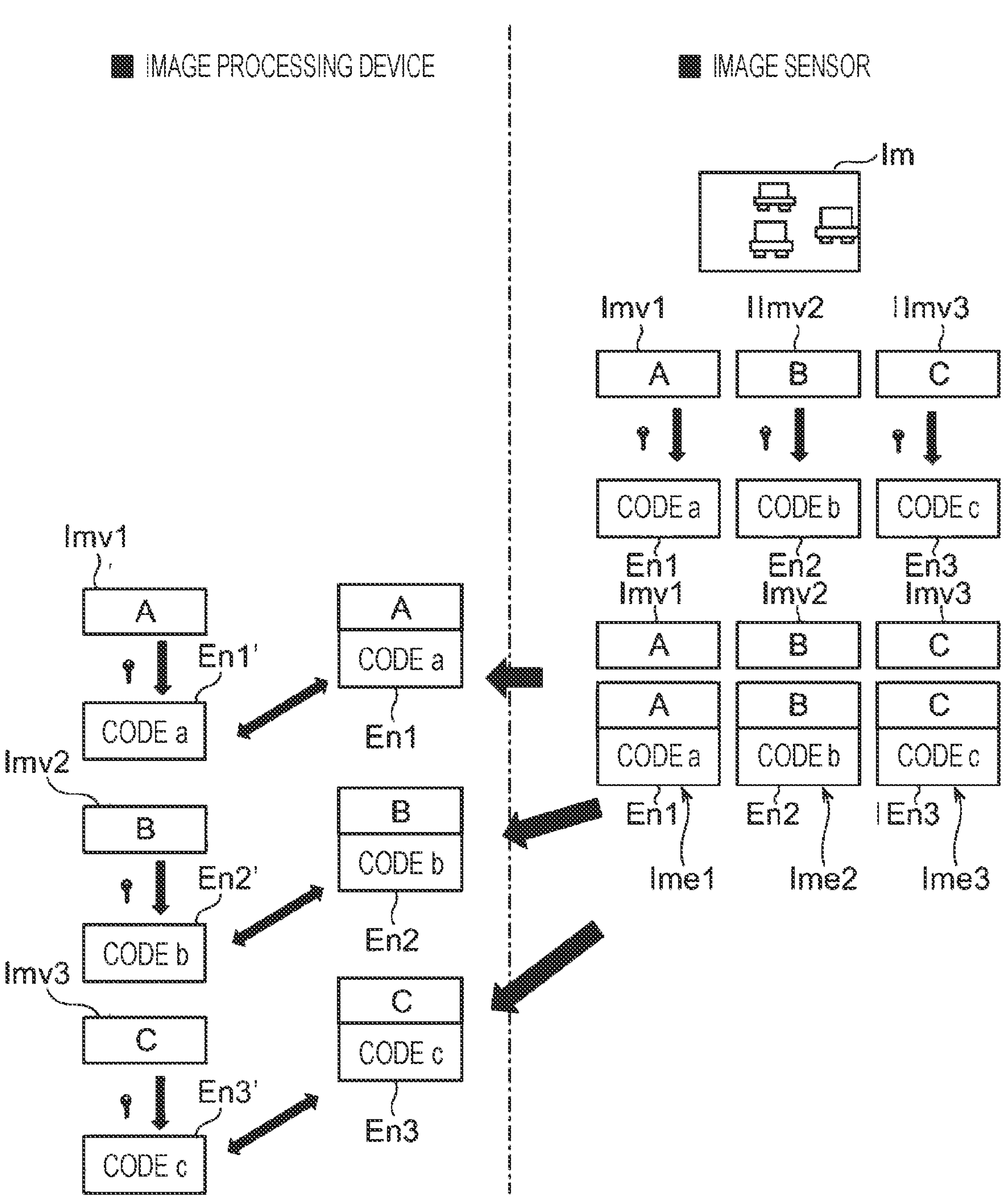
FIG. 7 is a diagram conceptually illustrating the coded information generated by the image sensor and the coded information generated by the image processing device in the processing of FIG. 5.

FIG. 6 and FIG. 7 are diagrams conceptually illustrating the coded information generated by the image sensor 100 and the coded information generated by the image processing device 200 in the processing of FIG. 5. In FIG. 6 and FIG. 7, processing performed by the image sensor 100 is conceptually illustrated under the notation "image sensor". Processing performed by the image processing device 200 is illustrated under the notation "image processing device".

FIG. 6 illustrates an example of performing the image authentication on one piece of image data. In this case, as illustrated in the upper part of FIG. 6 in the image sensor 100, coded information En is generated from image data Im using the session key generated by the image sensor 100 (step S525). Next, image data Ime embedded with the coded information En and the unprocessed image data Im are transmitted to the image processing device 200.

Thereafter, the image processing device 200 generates coded information En' from the received image data Im using the session key generated by the image processing device 200 (step S504). Thereafter, the image processing device 200 compares the coded information En' generated by the image processing device 200, the coded information En generated by the image sensor 100, and, in this example, the coded information En embedded in the image data (step S505).

The session key used by the image sensor 100 and the session key used by the image processing device 200 are the same key, so that the same coded information is generated if the image data to be encoded or encrypted by the session key is the same. Therefore, in the present embodiment, whether or not the image data transmitted to the image processing device 200 has been correctly transmitted is determined by the fact whether or not the coded information En' and the coded information En coincide with each other. In a case where the coded information En' and the coded information En do not coincide with each other, there is a possibility that the image data transmitted from the image sensor 100 is falsified. In a case where, for example, falsification such as replacement or change is made while the image data reaches the image processing device 200 from the image sensor 100, the coded information En' and the coded information En do not coincide with each other.

Furthermore, FIG. 7 illustrates an example of performing the image authentication on a plurality of pieces of divided image data Imv1 to Imv3 generated from one piece of image data Im. In this case, as illustrated in the upper part of FIG. 7, each piece of coded information En1 to En3 is generated from corresponding divided image data Imv1 to Imv3 using the session key generated by the image sensor 100 in the image sensor 100 (step S525). Next, image data Imel to Ime3, each of which is embedded with the corresponding coded information En1 to En3, and the divided image data Imv1 to Imv3 are transmitted to the image processing device 200.

Thereafter, the image processing device 200 generates coded information En1 to En3' from the received plurality of pieces of the divided image data Imv1 to Imv3 using the session key generated by the image processing device 200 (step S504). Thereafter, the image processing device 200 compares each of the coded information En1' to En3' generated by the image processing device 200 with the corresponding coded information En1 to En3 generated by the image sensor 100, that is in this example, the coded information En1 to En3 embedded in the divided image data (step S505). Therefore, whether or not the divided image data transmitted to the image processing device 200 has been correctly transmitted is determined by the fact whether or not the coded information En1' to 3' and the corresponding coded information En1 to 3En coincide with each other.

In the embodiment described above, the image sensor 100 includes the first key information storage unit 104 that holds the first secret key SK1 in advance, the communication unit 103 that receives the second public key PK2 corresponding to the second secret key SK2 different from the first secret key SK1 from the external apparatus, the first session key generation unit 105 that generates a session key on the basis of the first secret key SK1 and the second public key PK2, and the first encryption unit 106 that generates, on the basis of the session key generated by the first session key generation unit 105 and the image data, the coded information including at least one of authenticated information or encrypted information. Furthermore, the image processing device 200 includes the second key information storage unit 203 that obtains and holds the first public key PK1 corresponding to the first secret key SK1 (stored in the first certificate authority front face paper Ce1, to be exact) from the external apparatus, the communication unit 201 that transmits the second public key PK2, of the second secret key SK2 and the corresponding second public key PK2, to the external apparatus, the second session key generation unit 204 that generates the session key on the basis of the first public key PK1 and the second secret key SK2, and the second encryption unit 205 that generates, on the basis of the session key generated by the second session key generation unit 204 and the image data, the coded information including at least one of authenticated information or encrypted information.

Therefore, falsification of the image data transmitted from the image sensor 100 to the image processing device 200 can be efficiently inhibited at a high security level.

That is, in the information processing device S, which includes the image sensor 100 and the image processing device 200 as described above, is capable of transmitting the second public key PK2 from the communication unit 201 in the image processing device 200 to the communication unit 103 of the image sensor 100. Thereafter, it is possible to authenticate whether or not the coded information generated by the image sensor 100 using the session key based on the first secret key SK1 and the second public key PK2 coincide with the coded information generated by the image processing device 200 using the session key based on the second secret key SK22 and the first public key PK1. Specifically, the image sensor 100 generates the session key using the first secret key SK1 and the second public key PK2, and generates the coded information using the session key and the image data. The image sensor 100 then transmits the image data and the generated coded information to the image processing device 200. The image processing device 200 then generates the session key using the second secret key SK2 and the first public key PK1, and generates the coded information using the session key and the image data. Here, if the session key and the image data used by the image sensor 100 and the image processing device 200 are the same, the same coded information can be generated. Therefore, the image authentication can be performed between the image sensor 100 and the image processing device 200 by comparing the two pieces of coded information. In addition, falsification of the image data can be efficiently inhibited at a high security level by this image authentication.

Specifically, the coded information can be generated by a simple encryption algorithm using the session key as a key for encryption. Therefore, the coded information can be efficiently calculated. Furthermore, the session key used by the image sensor 100 and the session key used by the image processing device 200 are each generated when the image sensor 100 and the image processing device 200 start communicating with each other, by adding information obtained afterwards to precondition information, that is, information (the first secret key SK1 and the first public key PK1) held in advance by the image sensor 100 and the image processing device 200. It is thus difficult to extract or replace the session key. Therefore, for example, even if there is an attempt to avoid the image authentication of the image processing device 200 by transmitting falsified image data and coded information generated from the falsified image data disguising as the information from the image sensor 100 side to the image processing device 200, the keys used to generate the two pieces of coded information hardly coincide with each other, and thus it is difficult to pass the image authentication. According to the present embodiment, therefore, falsification of the image data can be efficiently inhibited at a high security level.

Furthermore, in the present embodiment, for example, in a case where the plurality of pieces of divided image data is generated from one piece of image data, different pieces of coded information are generated for each of the plurality of pieces of divided image data. Therefore, the security level of the image authentication can be enhanced. That is, for example, it is extremely difficult to appropriately establish authentication of mutually different pieces of coded information generated at the same time by using falsified information.

Furthermore, in the case where the plurality of pieces of divided image data is generated from one piece of image data, different pieces of coded information are generated for each of the plurality of pieces of divided image data as described above, and the image authentication is performed for each of the plurality of pieces of coded information. The device authentication for the image sensor 100 that generates image data can be performed, on the other hand, by only authenticating a single image sensor 100. In this case, it is advantageous in terms of cost as compared with a case where a plurality of pieces of image data corresponding to the plurality of pieces of divided image data is obtained by different image sensors. That is, in a case where a plurality of pieces of image data is obtained by a plurality of image sensors, the device authentication for each image sensor leads to increase in hardware resources to be used, which may be disadvantageous in terms of cost.

Note that in the present exemplary embodiment, when different pieces of coded information are generated for each of the plurality of pieces of divided image data generated from one piece of image data, encryption is performed using a session key. However, the coded information may be generated by any other method capable of generating different pieces of coded information for each of the plurality of pieces of divided image data. For example, the partial region in each of the plurality of pieces of divided image data may be converted by the MAC algorithm using any nontemporal common key to generate the MAC as the coded information. In addition, at this time, the partial region may be determined such that the partial region in the plurality of divided image data to be converted are different for each piece of the divided image data. In addition, when new divided image data is generated, the partial region in the plurality of divided image data to be converted may change randomly or in accordance with the lapse of time. In this case, the image sensor 100 and the image processing device 200 need to share a shared key. Furthermore, the image sensor 100 and the image processing device 200 need to share information of the partial region in the divided image data to be converted to the coded information.

<Hardware Configuration>

Figure 8:
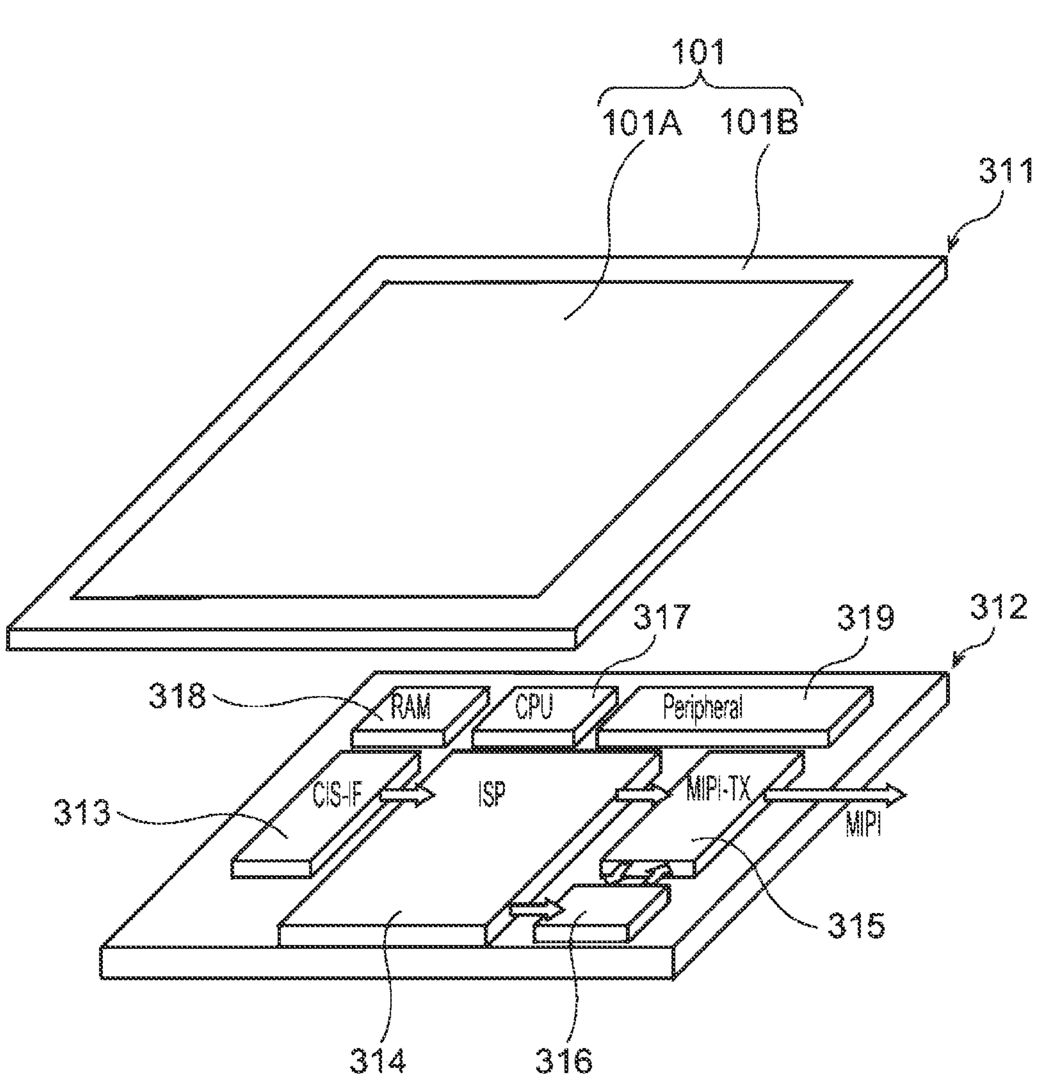
FIG. 8 is a diagram illustrating an example of a hardware configuration of the image sensor included in the information processing system of FIG. 2.

Hereinafter, examples of hardware configurations of the image sensor 100 and the image processing device 200 will be described. FIG. 8 is a diagram illustrating the hardware configuration example of the image sensor 100. In the example of FIG. 8, the image sensor 100 has a structure in which a plurality of (two in the drawing) semiconductor substrates 311 and 312 is stacked. The image sensor 100 includes the first semiconductor substrate 311 and the second semiconductor substrate 312. The image pickup unit 101 illustrated in FIG. 2 is mounted on the first semiconductor substrate 311. The image pickup unit 101 includes a pixel portion 101A in which a plurality of photoelectric conversion elements is regularly arranged, and a circuit portion 101B that transmits an image signal generated by the pixel portion 101A to the second semiconductor substrate 312. The circuit portion 101B is constituted by, for example, a through silicon via (TSV) or the like.

The second semiconductor substrate 312 overlaps the first semiconductor substrate 311 so as to face a surface of the first semiconductor substrate 311 opposite to a surface where the pixel portion 101A is exposed. A CIS interface (CIS-IF) 313, an image signal processor (ISP) 314, a MIPI interface (MIPI-TX) 315, an encryption circuit 316, a CPU 317, a RAM 318, and a peripheral 319 are mounted on the second semiconductor substrate 312.

The CIS interface 313 is a portion to which a signal from the image pickup unit 101 is provided. The ISP 314 generates image data based on a signal from the image pickup unit 101. The image data generation unit 102 illustrated in FIG. 2 is constituted by the ISP 314. The MIPI interface 315 is provided with image data from the ISP 314 and transmits the image data to the image processing device 200. The communication unit 103 illustrated in FIG. 2 is constituted by the MIPI interface 315.

The encryption circuit 316 is a circuit that encrypts the image data, and is constituted by, for example, a logic circuit. The encryption circuit 316 is constituted by a circuit physically different from the ISP 314 in the illustrated example. The encryption circuit 316 constitutes the first encryption module 110 illustrated in FIG. 2. That is, the encryption circuit 316 constitutes the first key information storage unit 104, the first session key generation unit 105, the first encryption unit 106, and the embedded data generation unit 107.

The encryption circuit 316 is provided with the image data from the ISP 314, and performs processing such as generating the coded information and embedding the coded information in the image data. The encryption circuit 316 then transmits the image data, in which the coded information is embedded, to the image processing device 200 through the MIPI interface 315. Furthermore, the CPU 317 executes, for example, control of the image sensor 100 by a program deployed in the RAM 318. The program may be recorded in a recording device included in the peripheral 319.

In the case where the image sensor 100 has a stacked structure of semiconductor substrates as described above, the image sensor 100 can be downsized. Note that it goes without saying that the image sensor 100 may be configured with other hardware configurations.

Figure 9:
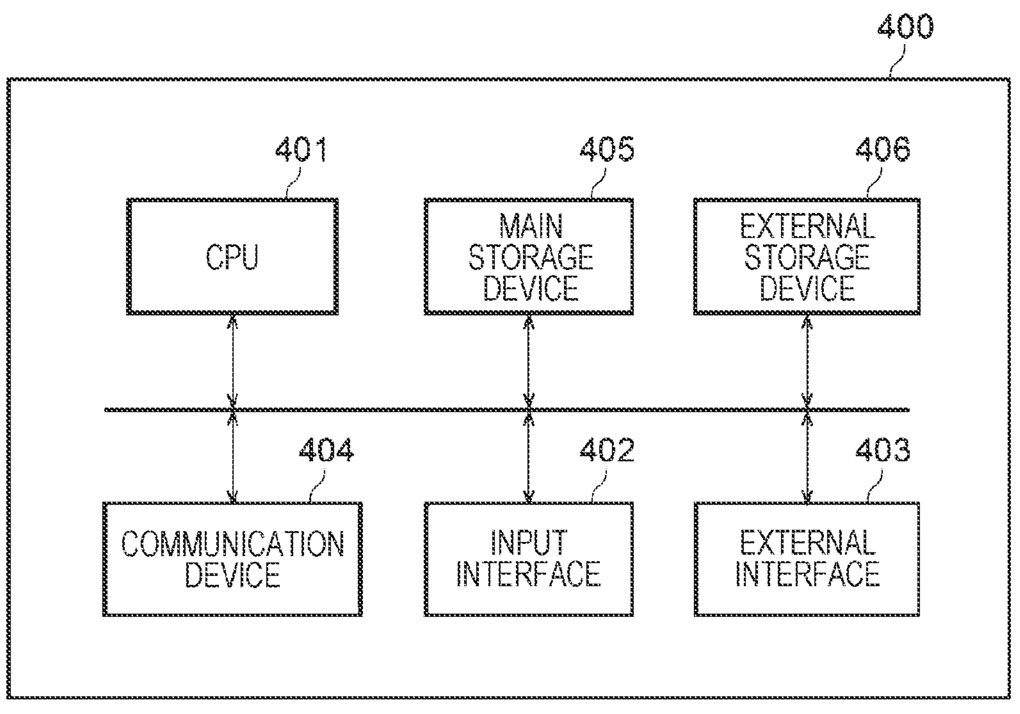
FIG. 9 is a diagram illustrating an example of a hardware configuration of the image processing device included in the information processing system of FIG. 2.

FIG. 9 illustrates, on the other hand, a hardware configuration example of the image processing device 200. The image processing device 200 may be constituted by a computer device 400. The computer device 400 includes a CPU 401, an input interface 402, an external interface 403, a communication device 404, a main storage device 405, and an external storage device 406 which are interconnected to each other via a bus. At least one of these elements may be omitted from the image processing device 200.

The central processing unit (CPU) 401 executes a computer program on the main storage device 405. The computer program is a program capable of implementing each of the foregoing functional configurations of the image processing device 200. The computer program may be implemented not by one computer program but by a combination of a plurality of computer programs and scripts. The CPU 401 executes the computer program, so that each functional configuration can be implemented.

The input interface 402 is, for example, a circuit for inputting to the image processing device 200 an operation signal from an input device operated by a driver of the vehicle V.

The external interface 403 can exhibit, for example, a function of displaying, on a display device, data stored in the image processing device 200. The external interface 403 may be connected to, for example, a liquid crystal display (LCD), an organic electroluminescence display, or the like.

The communication device 404 is a circuit for the image processing device 200 to communicate with an external device by wire or wirelessly. For example, the data generated by the image processing device 200 can be input to, for example, the vehicle control device 300 through the communication device 404. The communication device 404 may constitute the communication unit 201.

The main storage device 405 stores a computer program, data necessary for executing the computer program, data generated by executing the computer program, and the like. The computer program is deployed and executed on the main storage device 405. The main storage device 405 is, for example, a RAM, a DRAM, or an SRAM, but is not limited thereto.

The external storage device 406 stores a computer program, data necessary for executing the computer program, data generated by executing the computer program, and the like. These computer programs and data are read to the main storage device 405 when the computer program is executed. Examples of the external storage device 406 include a hard disk, an optical disk, a flash memory, and a magnetic tape, but are not limited thereto.

Note that the computer program may be installed in the computer device 400 in advance or may be stored in a storage medium such as a CD-ROM. Alternatively, the computer program may be uploaded on the Internet.

Furthermore, the computer device 400 may be configured as a single device, or may be configured as a system including a plurality of computer devices connected to each other.

Note that the embodiment described above illustrates an example for embodying the present disclosure, and the present disclosure can be implemented in various other forms. For example, various modifications, replacements, omissions, or combinations thereof can be made without departing from the gist of the present disclosure. Forms in which such modifications, replacements, omissions, and the like have been made are also included in the scope of the present disclosure and are likewise included in the invention described in the claims and the equivalent scopes thereof.

Furthermore, the effects of the present disclosure described in the present specification are mere examples, and other effects may be provided. In the embodiment described above, for example, the image sensor 100 holds the first secret key SK1 in advance, although the image sensor 100 may hold the first public key PK1 in advance. In this case, the first secret key SK1 is stored in the first certificate authority certificate Ce1. In addition, the image processing device 200 may provide the second secret key SK2 to the image sensor 100 when generating the second secret key SK2 and the second public key PK2.

Note that the present disclosure can have the following configurations.

[Item 1]

An information processing device including:

- a key information storage unit that holds a first key in advance;
- a communication unit that receives a second correspondence key corresponding to a second key from an external apparatus, the second key being different from the first key;
- a session key generation unit that generates a session key on the basis of the first key and the second correspondence key; and
- an encryption unit that generates, on the basis of the session key and data, coded information including at least one of authenticated information or encrypted information.

[Item 2]

The information processing device according to item 1, further including a data generation unit that generates the data.

[Item 3]

The information processing device according to item 2, in which the data generation unit generates image data as the data.

[Item 4]

The information processing device according to any one of item 1 to 3, in which the communication unit transmits the data and the coded information to the external apparatus.

[Item 5]

The information processing device according to any one of item 1 to 4, in which capable of generating one or a plurality of pieces of divided data from the data,

- the encryption unit generates, on the basis of the session key and the divided data, coded information including at least one of authenticated information or encrypted information corresponding to the divided data, and
- the encryption unit generates different pieces of the coded information for the data and one or a plurality of pieces of the divided data or a plurality of pieces of the divided data.

[Item 6]

The information processing device according to any one of item 1 to 5, in which the first key and the second key have a first attribute for performing one of encoding or decoding, and the second correspondence key has a second attribute for performing the other of the encoding or the decoding.

[Item 7]

The information processing device according to any one of item 1 to 6, in which the first key and the second key are secret keys, the second correspondence key is a public key, or the first key and the second key are public keys, and the second correspondence key is a secret key.

[Item 8]

The information processing device according to any one of item 1 to 7, in which the first key, the second key, and the second correspondence key are generated in accordance with elliptic curve cryptography.

[Item 9]

The information processing device according to any one of item 1 to 8, in which the first key, the second key, and the second correspondence key are generated in accordance with elliptic curve cryptography using a same elliptic curve.

[Item 10]

The information processing device according to any one of item 1 to 9, in which the key information storage unit further holds a first certificate in which an unencrypted first certificate is encrypted, the unencrypted first certificate being stored with a first correspondence key corresponding to the first key.

[Item 11]

The information processing device according to any one of item 1 to 10, in which the key information storage unit further holds a second certificate in which an unencrypted second certificate is encrypted, the unencrypted second certificate being stored with a first certificate authority public key.

[Item 12]

An information processing device including:

an information storage unit that obtains and holds a first correspondence key corresponding to a first key from an external apparatus or holds the first correspondence key corresponding to the first key in advance;

a communication unit that transmits a second correspondence key, of a second key and the second correspondence key, to the external apparatus, the second key being different from the first key and the second correspondence key corresponding to the second key;

a session key generation unit that generates a session key on the basis of the first correspondence key and the second key; and an encryption unit that generates, on the basis of the session key and data, coded information including at least one of authenticated information or encrypted information.

[Item 13]

The information processing device according to item 12, further including a second key generation unit that generates the second key and the second correspondence key.

[Item 14]

The information processing device according to item 12 or 13, in which the communication unit receives the data from the external apparatus.

[Item 15]

The information processing device according to any one of item 12 to 14, in which the communication unit receives the data and coded information corresponding to the data from the external apparatus.

[Item 16]

The information processing device according to item 15, further including an authentication unit that authenticates whether or not the coded information generated by the encryption unit and the coded information received by the communication unit from the external apparatus coincide with each other.

[Item 17]

The information processing device according to any one of item 12 to 16, in which the first key and the second key have a first attribute for performing one of encoding or decoding, and the second correspondence key and the second correspondence key has a second attribute for performing the other of the encoding or the decoding.

[Item 18]

The information processing device according to any one of item 12 to 17, in which the first key and the second key are secret keys, the first correspondence key and the second correspondence key are public keys, or the first key and the second key are public keys, and the first correspondence key and the second correspondence key are secret keys.

[Item 19]

The information processing device according to any one of item 12 to 18, in which the first key, the second key, the first correspondence key, and the second correspondence key are generated in accordance with elliptic curve cryptography.

[Item 20]

The information processing device according to any one of item 12 to 19, in which the first key, the second key, the first correspondence key, and the second correspondence key are generated in accordance with elliptic curve cryptography using a same elliptic curve.

[Item 21]

The information processing device according to any one of item 12 to 20, in which the communication unit receives from the external apparatus a first certificate in which an unencrypted first certificate is encrypted, the unencrypted first certificate being stored with the first correspondence key, and the information processing device further includes an authentication unit that decodes the first certificate using a first certificate authority public key.

[Item 22]

The information processing device according to item 21, in which the communication unit receives from the external apparatus a second certificate in which an unencrypted second certificate is encrypted, the unencrypted second certificate being stored with the first certificate authority public key, and the decryption unit decrypts the second certificate using a second certificate authority public key to obtain the first certificate authority public key.

[Item 23]

An information processing system including:

a first information processing device that includes:

a first key information storage unit that holds a first key in advance; a first communication unit that receives a second correspondence key corresponding to a second key different from the first key from an external apparatus; a first session key generation unit that generates a session key on the basis of the first key and the second correspondence key; and a first encryption unit that generates, on the basis of the session key and data, first coded information including at least one of authenticated information or encrypted information, the session key being generated by the first session key generation unit; and a second information processing device that includes:

a second key information storage unit that obtains and holds a first correspondence key corresponding to the first key from an external apparatus or holds the first correspondence key corresponding to the first key in advance; a second communication unit that transmits the second correspondence key, of the second key and the second correspondence key, to the external apparatus; a second session key generation unit that generates a session key on the basis of the first correspondence key and the second key; and a second encryption unit that generates, on the basis of the session key and data, second coded information including at least one of authenticated information or encrypted information, the session key being generated by the second session key generation unit, in which the second communication unit transmits the second correspondence key to the first communication unit, and authenticates whether or not the first coded information and the second coded information coincide with each other.

[Item 24]

The information processing system according to item 23, in which the session key generated by the first session key generation unit and the session key generated by the second session key generation unit are a same key.

[Item 25]

An information processing method for an information processing device that holds a first key in advance, the method including:

receiving a second correspondence key corresponding to a second key from an external apparatus, the second key being different from the first key;

generating a session key on the basis of the first key and the second correspondence key; and generating, on the basis of the session key and data, coded information including at least one of authenticated information or encrypted information.

[Item 26]

An information processing method for an information processing device that obtains and holds a first correspondence corresponding to a first key from an external apparatus or holds holds the first correspondence corresponding to the first key in advance, the method including:

transmitting a second correspondence key, of a second key and the second correspondence key, to an external apparatus, the second key being different from the first key and the second correspondence key corresponding to the second key;

generating a session key on the basis of the first correspondence key and the second key; and generating, on the basis of the session key and data, coded information including at least one of authenticated information or encrypted information.

[Item 27]

An information processing method between a first information processing device that holds a first key in advance and a second information processing device that obtains and holds a first correspondence key corresponding to the first key from an external apparatus or holds the first correspondence key corresponding to the first key in advance, the method including:

transmitting, from the second information processing device to the first information processing device, a second correspondence key, of a second key different from the first key and the second correspondence key corresponding to the second key;

generating, on the basis of the first key and the second correspondence key, a session key by the first information processing device;

generating, on the basis of the session key and data, first coded information including at least one of authenticated information or encrypted information, the session key being generated by the first information processing device;

generating, on the basis of the first correspondence key and the second key, a session key by the second information processing device;

generating, on the basis of the session key and data, second coded information including at least one of authenticated information or encrypted information, the session key being generated by the second information processing device; and authenticating whether or not the first coded information and the second coded information coincide with each other.

[Item 28]

A computer program that causes a computer to execute the steps including:

receiving a second correspondence key corresponding to a second key from an external apparatus, the second key being different from a first key;

generating a session key on the basis of the first key and the second correspondence key; and generating, on the basis of the session key and data, coded information including at least one of authenticated information or encrypted information.

[Item 29]

A computer program that causes a computer to execute the steps including:

transmitting a second correspondence key corresponding to a second key to an external apparatus, the second key being different from a first key;

generating a session key on the basis of a first correspondence key and the second key, the first correspondence key corresponding to the first key; and generating, on the basis of the session key and data, coded information including at least one of authenticated information or encrypted information.

[Item 30]

An imaging system including:

a host control unit having a first secret key; and an image sensor unit having a second secret key, in which a public key is generated, in the host control unit, by the first secret key, a first session key is generated, in the host control unit, by the first secret key and the public key, a second session key is generated, in the image sensor unit, by the second secret key and the public key, image data is encoded, in the image sensor unit, by the second session key, and the image data is decoded, in the host control unit, by the first session key.

[Item 31]

The imaging system according to item 30, in which the image sensor unit includes a first substrate and a second substrate, the second substrate is disposed below the first substrate, the first substrate includes a pixel array unit, and the second substrate has the second secret key.

REFERENCE SIGNS LIST

S Information processing system
V Vehicle
1 Front view camera
100 Image sensor
101 Image pickup unit
101A Pixel portion
101B Circuit portion
102 Image data generation unit
103 Communication unit
104 First key information storage unit
105 First session key generation unit
106 First encryption unit
107 Embedded data generation unit
110 First encryption module
200 Image processing device
201 Communication unit
202 Second key generation unit
203 Second key information storage unit
204 Second session key generation unit
205 Second encryption unit
206 Authentication unit
207 Image recognition processing unit
208 Output unit
210 Second encryption module
300 Vehicle control device
311 First semiconductor substrate
312 Second semiconductor substrate
313 CIS interface

314 ISP
315 MIPI interface
316 Encryption circuit
317 CPU
318 RAM
319 Peripheral
400 Computer device
401 CPU
402 Input interface
403 External interface
404 Communication device
405 Main storage device
406 External storage device
Ce1 First certificate authority certificate
Ce2 Second certificate authority certificate
CA1 First certificate authority
CSK1 First certificate authority secret key
CPK1 First certificate authority public key
CA2 Second certificate authority
CSK2 Second certificate authority secret key
CPK2 Second certificate authority public key
SK1 First secret key
PK1 First public key

What is claimed is:

1. An image sensor, comprising one or more circuits to:
store a first private key in memory;
receive a second public key corresponding to a second private key from an external apparatus;
generate a session key based at least in part on the first private key and the second public key;
generate image data;
generate, based at least in part on the session key and the image data, coded information including at least one of authenticated information and encrypted information; and
transmit the image data and the coded information to the external apparatus, wherein the coded information enables the external apparatus to authenticate the image data.

2. The image sensor according to claim 1, wherein the one or more circuits are further to divide the image data into a plurality of pieces of divided image data.

3. The image sensor according to claim 2, wherein respective coded information for each piece of the divided image data is generated based at least in part on the session key and the respective piece of the divided image data.

4. The image sensor according to claim 1, wherein the one or more circuits are further to embed the coded information in the image data before transmitting the image data to the external apparatus.

5. The image sensor according to claim 1, wherein the one or more circuits are further to:
generate one or more pieces of divided data from the image data,
generate, based on the session key and the divided data, respective coded information corresponding to each piece of the divided data.

6. The image sensor according to claim 1, wherein
the first private key and the second private key each include a first attribute for performing one of encoding or decoding, and
the second public key includes a second attribute for performing other of the encoding or the decoding.

7. The image sensor according to claim 1, wherein one of:
the first private key and the second private key are secret keys.

8. The image sensor according to claim 1, wherein the first private key, the second private key, and the second public key are generated in accordance with elliptic curve cryptography.

9. The image sensor according to claim 8, wherein the first private key, the second private key, and the second public key are generated using a same elliptic curve.

10. The image sensor according to claim 1, wherein the one or more circuits are further to store a first certificate in which an unencrypted first certificate is encrypted, the unencrypted first certificate including a first public key corresponding to the first private key.

11. The image sensor according to claim 10, wherein the one or more circuits are further to store a second certificate in which an unencrypted second certificate is encrypted, the unencrypted second certificate including a first certificate authority public key.

12. An image processing device, comprising one or more circuits to:
generate a second private key and a second public key;
transmit the second public key to an external apparatus;
generate a session key based on the second private key and a first public key corresponding to a first private key of the external apparatus;
receive image data and first coded information from the external apparatus;
generate, based at least in part on the session key and the image data, second coded information including at least one of authenticated information and encrypted information; and
authenticate the image data by determining the first coded information and the second coded information coincide.

13. The image processing device according to claim 12, wherein the image data comprises a plurality of frames and the one or more circuits are further to generate the second private key and the second public key for each frame of the image data.

14. The image processing device according to claim 12, wherein the external apparatus comprises an image sensor.

15. The image processing device according to claim 14, wherein the first coded information is embedded in the image data received from the external apparatus.

16. The image processing device according to claim 15, wherein determining the first coded information and the second coded information coincide comprises determining the first coded information is equal to the second coded information.

17. The image processing device according to claim 12, wherein
the second private key includes a first attribute and the second public key includes a second attribute different from the first attribute.

18. The image processing device according to claim 12, wherein
the second private key is a secret key.

19. The image processing device according to claim 18, wherein the second private key and the second public key are generated in accordance with elliptic curve cryptography.

20. The image processing device according to claim 19, wherein the first public key, the second private key, and the second public key are generated using a same elliptic curve.

21. The image processing device according to claim 12, wherein the one or more circuits are further to:
receive from the external apparatus a first certificate storing the first public key, and obtain the first public key by validating the first certificate using a first certificate authority public key.

22. The image processing device according to claim 21, wherein the one or more circuits are further to:

receive from the external apparatus a second certificate image storing the first certificate authority public key, and obtain the first certificate authority public key by validating the second certificate using a second certificate authority public key.

23. An imaging system, comprising:

an image sensor comprising a first one or more circuits to:

store a first private key in memory;

receive, from an image processing device, a second public key corresponding to a second private key;

generate a first session key based at least in part on the first private key and the second public key;

generate image data; and generate, based at least in part on the first session key and the image data, first coded information; and an image processing device comprising a second one or more circuits to:

generate the second private key and the second public key;

transmit the second public key to the image sensor;

generate a second session key based at least in part on the second private key and a first public key;

receive the image data and the first coded information from the image sensor;

generate, based at least in part on the second session key and the image data, second coded information; and authenticate the image data by determining the first coded information and the second coded information coincide.

24. The imaging system according to claim 23, wherein the first session key matches the second session key.

* * * * *